July 18, 1933.　　　J. T. LAKE　　　1,918,606
FUEL METERING APPARATUS
Filed Jan. 22, 1930
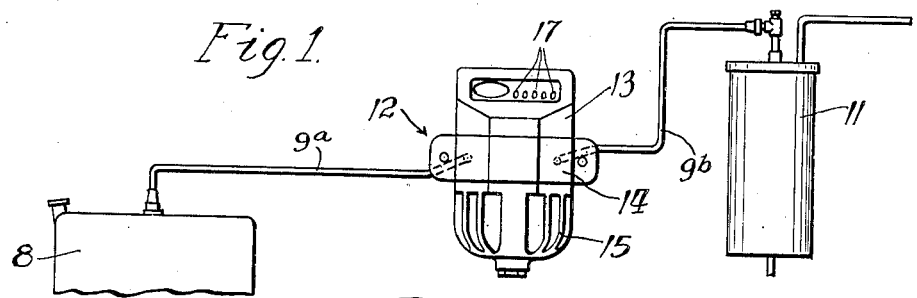
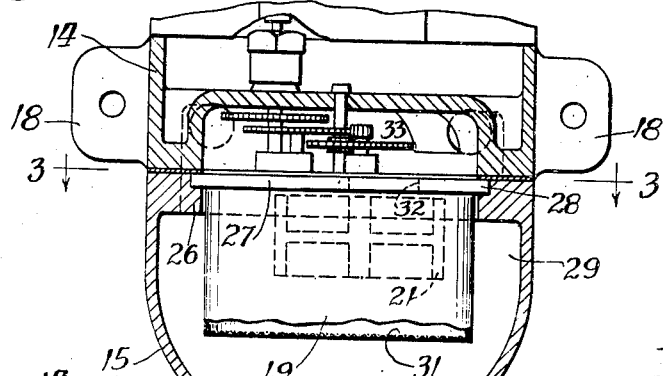
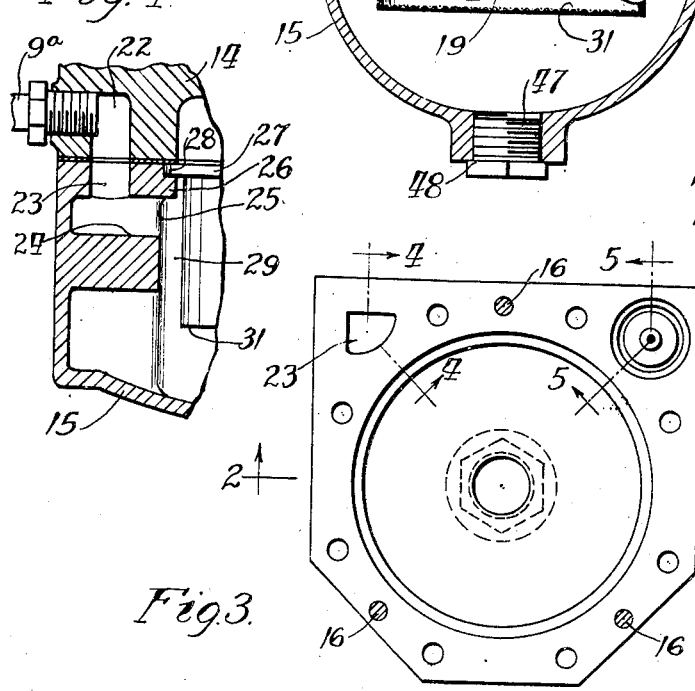
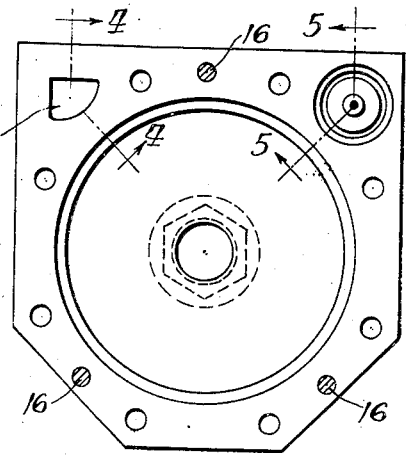
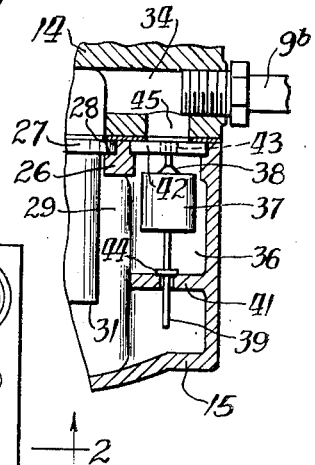
Inventor
Jarrett T. Lake
By Brown, Jackson, Boettcher & Dienner
Att'ys.

Patented July 18, 1933

1,918,606

UNITED STATES PATENT OFFICE

JARRETT T. LAKE, OF WILMETTE, ILLINOIS, ASSIGNOR TO ECONOMY ELECTRIC DEVICES CO., OF CHICAGO, ILLINOIS, A CORPORATION OF ILLINOIS

FUEL METERING APPARATUS

Application filed January 22, 1930. Serial No. 422,540.

The present invention relates to fuel metering apparatus or systems such as are employed in motor trucks, busses and other self-propelled vehicles for indicating or registering the consumption of liquid fuel used in their propulsion. As will hereinafter appear, the invention is primarily concerned with by-passing or shunting air or vapor which may be mixed with the fuel, and while the invention has perhaps its greatest utility in connection with fuel metering apparatus it will be understood that its use is not limited to such apparatus but is adaptable to other liquid apparatus where like problems arise. The type of fuel metering apparatus herein disclosed usually comprises a flow meter interposed in the fuel feed line extending between the supply tank and the point of use, such flow meter registering the amount of liquid fuel used, thereby indicating the operating efficiency of the vehicle and of the driver.

I have found that in the majority of these fuel metering systems, as heretofore constructed, an appreciable error is introduced in the registration of the meter owing to air or vapor being carried through the meter along with the flow of liquid fuel. Such meters are usually of the displacement type, and hence respond to the flow of air or vapor therethrough as well as to the flow of fuel.

The leakage of air into the fuel feed line may occur in various ways. For example, such leakage may occur through the fittings and connections between the supply tank and the meter, it being almost impossible to maintain this portion of the fuel feed line absolutely air tight. Moreover, when the liquid level in the supply tank is low, the splashing of the fuel therein will frequently admit air to the fuel supply conduit. Where a vacuum tank is used as the flow creating means, or where the liquid is sucked from the supply tank by any standard form of pump, there is a particular tendency for air to be drawn into the line through any leaks in the line or pump because during the suction impulse the pressure on the fuel in the line is below atmospheric pressure. Moreover, when the vacuum tank ceases drawing fuel there is a tendency for air to leak back into the feed line notwithstanding the provision of a check value between the feed line and the supply tank, such check valve frequently permitting a slow leak and thereby allowing air to return down through the feed line. Furthermore, the emptying of the supply tank will vent air up through a suction operated feed line.

The natural evaporation of the fuel, particularly in warm weather, also creates a vapor which, if allowed to pass through the flow responsive means of the meter, will give an erroneous indication of the amount of liquid fuel actually supplied to the engine.

The principal object of the present invention is to avoid these difficulties by providing improved means which will prevent any air or vapor flowing up through the fuel feed line from passing through the measuring chamber of the meter and affecting the flow responsive means therein. More specifically, the improved means functions as a trap and by-pass for separating all entrained air and vapor from the fuel and by-passing it around such measuring chamber or flow responsive means of the meter.

By the provision of this air by-pass, inaccuracies of the meter are reduced to a minimum, since the meter then only measures the liquid fuel, and in addition thereto the necessity of maintaining tight joints in the fuel feed line is avoided. Moreover, such arrangement makes it futile to attempt to tamper with the registration of the meter, as is frequently done, such practice consisting in loosening one or more of the connections in the fuel feed line to admit air for the purpose of falsely increasing the reading of the meter. This air by-pass arrangement also avoids the necessity of the check valve which is usually disposed at the supply tank end of the fuel feed conduit, thereby simplifying and facilitating the installation of the metering apparatus.

Another object of the invention is to provide a fuel feed system having this arrangement of air trap and by-pass which can be installed without necessitating the use of any additional conduits other than the fuel conduit, and without necessitating the making of any other connections than those ordinarily required in the installation of the fuel meter. Simplicity of installation is a very desirable feature in these devices, and the necessity of providing a separate air line and of making numerous additional connections to accommodate the air trap and by-pass is more or less objectionable. This is avoided in the present construction, which only requires that the fuel meter be connected in the fuel feed line, the same as if no air trap and by-pass were provided.

Such is made possible by embodying the air trap and by-pass within the meter structure as a part thereof.

A further object is to provide an improved construction wherein the fuel, upon entering the meter, first has the air and vapor separated therefrom, is then passed into a settling basin for the accumulation of dirt and water, and is then passed upwardly into the measuring chamber of the meter through a straining screen between the settling basin and the measuring chamber. By reason of this upward flow of the fuel through such screen, any particles of dirt caught by the screen adhere to the lower side thereof so that in draining the meter for cleaning purposes the flow of the fuel is reversed or downward through the screen for more effectively cleaning the dirt particles therefrom.

Other objects of the invention will appear in the following description of a preferred embodiment thereof.

In the accompanying drawing illustrating such embodiment:

Figure 1 is a diagrammatic view of a fuel feed system illustrating a flow meter interposed in the fuel feed line, in which meter the present air trap and by-pass are embodied.

Figure 2 is a vertical sectional view through the lower portion of the meter, taken approximately on the plane of the line 2—2 of Figure 3.

Figure 3 is a horizontal sectional view through the lower portion of the meter taken approximately on the plane of the line 3—3 of Figure 2.

Figure 4 is a vertical sectional view taken approximately on the plane of the line 4—4 of Figure 3 showing the point at which the fuel and any air or vapor enter the meter, and Figure 5 is a similar sectional view taken on the plane of the line 5—5 of Figure 3 illustrating the point at which the fuel and any such air or vapor leave the meter.

The conventional fuel feed system illustrated in Figure 1 comprises the main supply tank 8 usually located at the rear of the vehicle, the fuel feed line leading therefrom represented by the two sections of conduit 9a and 9b, and the well known vacuum tank or other fuel feeding means generally indicate at 11.

Where a vacuum tank is employed, such tank derives its suction from the intake manifold of the internal combustion engine for creating the fuel flow, and comprises the usual arrangement of a level responsive float and valves actuated thereby for intermittently applying suction to the conduit 9b whenever fuel is required. The construction of the typical vacuum tank and its operation are well known and need not be described in detail.

This tank supplies the fuel to the carbureter of the internal combustion engine.

Interposed in the fuel feed line 9a, 9b is the flow meter which is indicated in its entirety at 12. Insofar as the fuel measuring and indicating features of this meter are concerned, it may be of any desired construction, the preferred form illustrated being of the registering cyclometer type comprising a displacement type of measuring chamber connected in the fuel feed line with a rotating element in said chamber responsive to the flow of fuel therethrough. In the construction illustrated, the meter comprises the upper housing section 13, the intermediate connecting portion 14 and the lower bowl portion 15, these three portions being all connected together by screws 16 which pass from the lower portion 15 upwardly through the intermediate portion 14 and tap into the upper portion 13. The intermediate casing portion 14 has the cyclometer wheels 17 mounted thereon, and the upper housing portion 13 forms a casing for such wheels. Extending from the sides of the intermediate housing portion 14 are two apertured lugs 18 by which the meter is mounted on the vehicle.

Within the lower housing portion 15 is the measuring chamber 19 in which the flow responsive element, generally indicated at 21, is arranged to operate. This flow responsive element may be either of the oscillating, rotating or piston type, such, per se, forming no part of the present invention. This flow responsive element is operatively connected with the cyclometer wheels 17 through any preferred arrangement of gearing or motion transmitting mechanism, or may operate a distant dial by any suitable means.

The fuel inlet and outlet connections are preferably established with the meter at the rear side of the intermediate housing section 14. The conduit section 9a connects with an inlet port 22 in such housing section, which port extends downwardly and communicates with an opening or passageway 23 cored in one corner of the lower casing section 15. The fuel flowing down through this inlet passageway 23 encounters a baffle or deflecting surface 24 which directs the fuel laterally through the opening 25 into the bowl shaped space of the lower housing section 15. The upper portion of this housing section has an inwardly extending annular flange 26, and the upper end of the measuring chamber 19 is provided with a flange 27 which seats in a counter bore or groove 28 provided in the top of the flange 26. Below said inwardly extending flange 26, the side walls of the housing section 15 are spaced from the side walls of the measuring chamber 19, thereby defining a relatively large chamber area indicated generally at 29, which extends around the measuring chamber within the upper portion of the housing section 15.

The deflecting baffle 24 is positioned at such a height that the entering fuel is deflected through the opening 25 into the upper portion of this chamber area 29. The circulation of the liquid fuel entering said housing section is first downwardly around the lower edge of the measuring chamber 19 and then upwardly through a cleaning screen 31 which extends across the open bottom of this measuring chamber.

It is desirable that only the liquid fuel take this course, and that any air or vapor be prevented from passing down around the lower edge of the measuring chamber and hence passing therethrough with the fuel. This is the purpose of the illustrated arrangement of the inlet passageway 23, 25 and the baffle 24, such deflecting the entering fuel in a lateral direction into the upper portion of the chamber area 29 so that the air and vapor will be separated or trapped in such upper portion of the chamber area. Hence, even if the fuel should enter the meter under a relatively high velocity there is no possibility of entrained bubbles of air or vapor being swept by this relatively high velocity flow downwardly around the lower edge of the measuring chamber 19.

The liquid fuel, after passing upwardly through the screen 31 and acting on the flow responsive element 21 of the measuring chamber, passes out of the top of said chamber through a port 32 and enters a cavity 33 in the under side of the intermediate housing section 14.

Extending outwardly from this cavity is an outlet passageway 34 with which the pipe section 9b connects at the rear side of the housing section 14. Thus the direction of fuel flow is through the inlet port 22, down through passageway 23 thence through lateral opening 25, down around the edge of the measuring chamber 19, upwardly through the screen thereof and in actuating contact with the flow responsive element 21, thence through port 32, cavity 33 and outlet passageway 34 to the pipe section 9b and to the fuel receiving receptacle 11.

The air and any vapor is separated from the liquid fuel at the point where the fuel enters the chamber area 29 through the opening 25, and this air and vapor is trapped in the upper portion of said chamber area.

Such air and vapor is by-passed around the measuring chamber 19 and put back into the fuel flowing through outlet pipe line 9b, by the coaction of a by-pass port and float controlled valve regulating the same, which I shall now describe.

Formed in one corner of the bottom section 15 is a pocket or chamber 36 having an open inner side communicating directly with the chamber area 29 so that this pocket forms an extension thereof. Operating in this chamber extension is a float 37 on the upper end of which a tapered valve 38 is mounted. The float and valve are secured to a guide rod 39 which has its lower end sliding in an apertured web 41 and which has its upper end sliding in a valve disk 42 seated in an annular groove in the upper end of the chamber extension 36.

Said disk has a valve port 43 therein which is adapted to be controlled by the conical valve 38. A collar 44 on the lower portion of the guide rod 39 is adapted to engage the web 41 for limiting the downward movement of the float valve away from said port. The upper end of the port 43 communicates through an opening 45 in the lower portion of the intermediate casting 14 with the outlet port or passageway 34 leading to the pipe line 9b.

In the operation of the device, it will be noted that all air and vapor separated from the fuel will accumulate in the upper portion of the chamber area 29, as previously described, and will be present in the upper portion of the chamber extension 36. When a sufficient or predetermined amount of air or vapor has collected in this portion of the device, the fuel level in the bowl portion 15 lowers to the point where the float 37 drops and withdraws by-pass valve 38 away from by-pass port 43. Thereupon such accumulation of air or vapor passes upwardly through said by-pass port and thence passes through the outlet passageway 34 and pipe line 9b to the fuel receiving receptacle 11. The size of the by-pass port 43 is preferably such that while the air is being by-passed in this manner around the measuring chamber, no fuel is flowing through said measuring chamber. When the accumulation of air and vapor is substantially reduced or exhausted, the float 37 rises with the rising level of the fuel, bringing the valve 38 into seating engagement with the port 43, whereupon the fuel is then drawn through the measuring chamber 19.

The float controlled valve 37, 38 is preferably proportioned in size and buoyancy so that no large amount of air and vapor is trapped at any one time.

It will be seen from the foregoing that by the present construction I have provided an air trap and float controlled by-pass therefor which is embodied completely within the flow meter structure.

Such trap and by-pass are operative between the fuel inlet passageway 22 of the meter and the fuel outlet passageway 34 thereof, so that the two sections 9a and 9b of the single feed line suffice for the entire installation, there being no necessity of a separate by-passing pipe line nor any necessity of making additional connections in the system beyond those ordinarily required where no provision for by-passing the air is made.

The bowl shaped bottom of the lower casing section 15 is provided with a drain port 47 which is closed by a removable drain plug 48. The bottom of this housing section constitutes a settling basin for dirt and water. Owing to the fact that the flow of the fuel through the straining screen 31 is in an upward direction, all particles of dirt adhering to the screen will be on the underside thereof. Hence, when the drain plug 48 is removed for cleaning the device, the reversed flow of the fuel down through the screen 31 will remove these adhering particles of dirt and effectively clean the screen.

While I have referred to the device 11 as being a vacuum fuel feed tank, nevertheless it will be understood that my invention is also adaptable to other fuel feeding systems, in which case the element 11 would represent any form of pump or other device functioning as any fuel receiving receptacle.

I claim:

1. In a liquid fuel supply system, the combination with a supply tank, a fuel receiving device, and a fuel feed conduit extending between said supply tank and said fuel receiving device, of a flow meter interposed in said fuel feed conduit, and comprising a separating chamber, a fuel measuring chamber receiving fuel from said separating chamber, means providing a fuel inlet passageway opening into said separating chamber, baffle means in the upper portion of said separating chamber and cooperating with said inlet passageway for directing the entering fuel and any air into the upper portion of said separating chamber to cause any entrained air to separate from the fuel and accumulate in the upper portion of said separating chamber, there being an outlet passageway in communication with the discharge end of said measuring chamber, means providing an air by-pass port extending from said separating chamber to said outlet passageway, and a valve controlling said air by-pass port.

2. In a liquid fuel supply system, the combination with a supply tank, a fuel receiving device, and a fuel feed conduit for conveying the fuel from said supply tank to said receiving device, of a flow meter interposed in said conduit for measuring and indicating the quantity of fuel conveyed therethrough, said flow meter comprising a separating chamber, a fuel measuring chamber extending down into said separating chamber for receiving its fuel from the lower portion thereof and defining an upper chamber area within said separating chamber, means providing a fuel inlet passageway opening into said upper chamber area, means providing a fuel outlet passageway communicating with the discharge end of said measuring chamber, there being an air by-pass port extending from said upper chamber area to said outlet passageway, a liquid level responsive valve governing said air by-pass port, a straining screen in the lower portion of said measuring chamber, and a drain outlet in the lower portion of said separating chamber.

3. A flow meter comprising a separating chamber, means providing a fuel inlet passageway opening into said separating chamber, a fuel measuring chamber having its inlet port disposed adjacent to the lower portion of said separating chamber, means providing a fuel outlet passageway communicating with the discharge port of said measuring chamber, a flow responsive element in said measuring chamber, a straining screen in the admission port of said measuring chamber, whereby the flow of liquid to said measuring chamber is upwardly through said screen, a drain outlet in said separating chamber below said screen, and means for by-passing air accumulating in the upper portion of said separating chamber around said measuring chamber to said fuel outlet passageway.

4. A flow meter comprising a casing having an upper inwardly directed flange with an opening therethrough, an inlet leading into the upper part of said casing, flow responsive means seated on said flange and including means establishing a measuring chamber extending to a point near the lower part of said casing and opening into communication with the interior of the casing, a cover for the casing and the measuring chamber and defining an outlet for the latter, and float controlled valve means adjacent the opening in said casing flange and adapted to open communication between said outlet and the upper part of said casing exterior of said measuring chamber through the opening in the casing flange.

5. A flow meter comprising a casing having an upper inwardly directed flange provided with an opening, an inlet leading into the upper part of said casing, a hollow member seated on the flange and opening at its lower end into the lower portion of the casing, the space surrounding said member below the flange thereby acting as a gas trap, a chambered cover seated on the upper part of said casing, the upper end of said member opening into communication with the chamber of said cover, outlet means leading from said cover, fluid flow responsive means in said member, and a liquid level responsive valve adapted to open and close communication between said outlet and the upper part of said trap through the opening in said inwardly directed flange whereby when a mixture of gas and liquid flows through the inlet the gas collects in the trap in the top of the casing and the liquid collects in the bottom of the casing and seals the lower end of said hollow member, the liquid then flowing through said member and flow responsive means to the outlet and the gas by-passing the flow responsive means by flowing through said valve to the outlet.

6. In a liquid fuel supply system, the combination of a meter for measuring fluid flow and comprising flow responsive means and a cylindrical shell therefor, and a hollow lower casing receiving the cylindrical shell, the latter extending to a point near the bottom of the lower casing, inlet means for the fuel supply communicating with the upper part of the casing exteriorly of said shell, whereby the upper part of said casing acts to separate and trap any gas in the fuel and the lower part acts to trap sediment and the like, a screen positioned over the lower end of said shell, an upper casing secured to said lower casing and defining an upper chamber for receiving the liquid which passes up through said shell and flow responsive means, valve controlled means adapted to establish communication between said upper chamber and said trap, and a float controlling said valve and adapted to open the valve before the liquid level in said lower casing is below the lower end of said shell.

7. A flow meter comprising a casing having an upper inwardly directed flange, an inlet leading into the upper part of said casing, flow responsive means fixedly seated on said flange and including a downwardly extending shell establishing a measuring chamber extending to a point near the lower part of said casing and opening at its lower end into communication with the interior of the casing, a cover for the casing and the measuring chamber and defining an outlet for the latter, and float controlled valve means comprising a valve opening in the casing adapted to establish communication between said outlet and the upper part of said casing exterior of said measuring chamber, a vertically reciprocable valve stem having a valve and a float thereon, and guide means on said casing for said stem.

8. A flow meter comprising flow measuring means having an enclosing cylindrical shell, the lower end of which is open and acts as an inlet and the upper end as an outlet, a casing secure to and enclosing the lower end of said shell and dimensioned to define a gas trapping space surrounding said shell and extending above the lower end thereof, an inlet conduit communicating with said space, and valve controlled vent means disposed in said gas trapping space exterior of said cylindrical shell and adapted to permit discharge of gas collected above the lower end of said shell.

9. A flow meter comprising a casing having upper and lower sections, said upper section having separated inlet and outlet ports, said lower section having at the upper portion thereof a laterally inwardly extending flange, a measuring device comprising a shell and flow responsive means therein, said device being supported by said flange and extending inwardly of the casing toward the lower portion of said lower section, said inwardly directed flange having separated ports adapted to register, respectively, with said inlet and outlet ports of the upper section when both of said sections are secured together, and valve controlled means associated with the port in said flange which communicates with the outlet port of the upper section for permitting the escape of gases without going through said flow responsive means.

10. A flow meter comprising a casing having connected upper and lower sections, the upper section being provided with inlet and outlet ports and the lower section having at its upper end laterally inwardly directed flange means, a meter shell having at its upper end an outwardly directed flange adapted to be seated on the inwardly directed flange of said lower section, said shell extending downwardly into the lower section and having a lower open end, a screen disposed over said opening, said inwardly directed flange of the lower section having ports communicating with the inlet and outlet ports of the upper section when both of said sections are connected together, and liquid level controlled valve means associated with the port in said flange which communicates with the outlet port of the upper section to provide for the escape of gases collecting around the meter shell adjacent the inwardly directed flange of said lower section.

JARRETT T. LAKE.